April 30, 1935. H. L. HICKMAN 1,999,456
VACUUM REGULATING VALVE
Filed Aug. 12, 1933
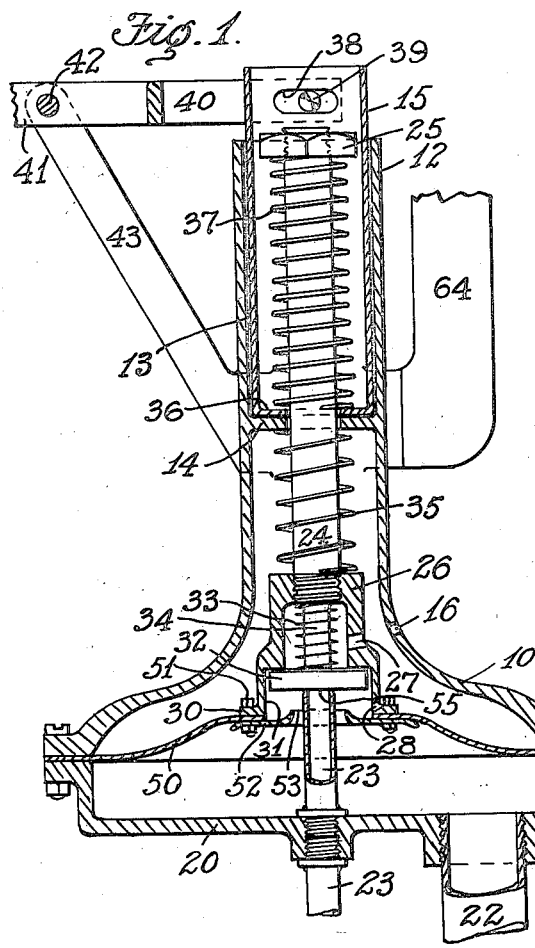
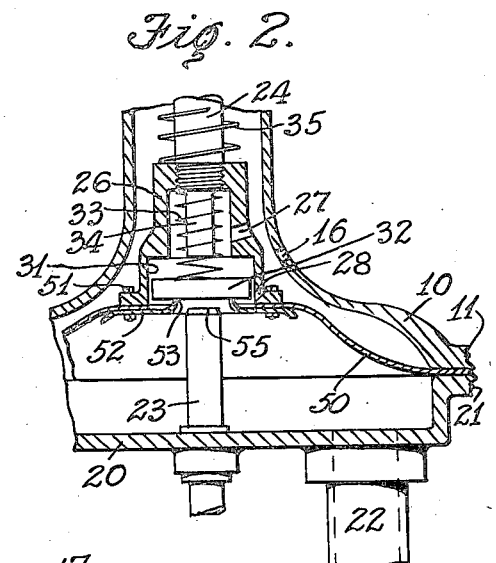
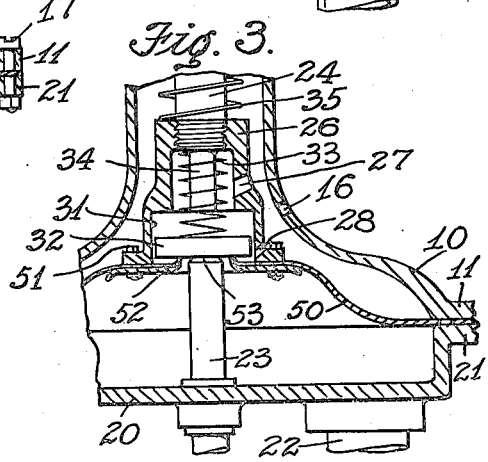
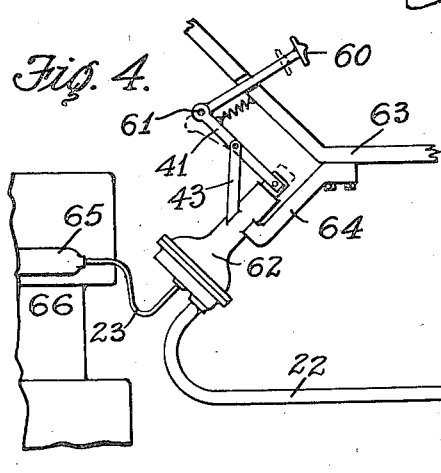
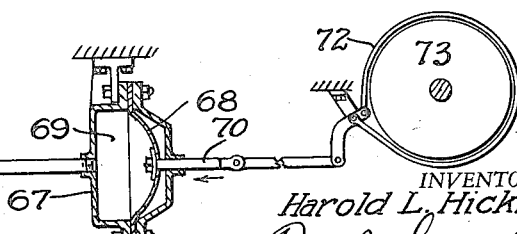
INVENTOR
Harold L. Hickman
BY Ross J. Garofalo
ATTORNEY.

Patented Apr. 30, 1935

1,999,456

UNITED STATES PATENT OFFICE 1,999,456

VACUUM REGULATING VALVE

Harold L. Hickman, Hawthorne, Calif.

Application August 12, 1933, Serial No. 684,891

2 Claims. (Cl. 303—54)

This invention relates to vacuum regulating devices. The invention relates particularly to a vacuum regulating valve for controlling vacuum where the latter is employed to actuate movable parts such as for example, the brakes of an automobile, the doors of a street car, house or building, or in general to any unit desired to be moved. However, the invention is particularly adapted for the application of brakes of motor vehicles.

In recent years, considerable progress has been made in solving brake problems. Due to the fact that the speed of motor vehicles has increased considerably and a greater number of vehicles are on the highways, the demand for better and more adequate braking systems has necessitated considerable study along this line. The old types of braking devices are no longer adequate to give quick and efficient stopping or control of the motor vehicle on the highway. Moreover, in the case of trucks, improved highways with modified grades and fewer curves permit the handling of loads of many tons. Vehicles operating at normal speeds of 30 to 40 miles per hour with such loads necessitate the use of strong drivers so as to apply the necessary force to operate the conventional mechanical brakes. The available physical energy is entirely inadequate for satisfactory deceleration of the vehicle.

In recent years mechanical means of deceleration has been devised to conserve the human energy necessary to obtain the desired deceleration. Through mechanical devices known as power brake systems or brake assisters, the vacuum developed in the engine intake manifold has been utilized to operate such mechanical devices which in turn actuate the braking mechanism of the automobile. The application of the vacuum is controlled by means of valves which permit either the introduction of vacuum into the mechanism actuating the brake pull rod or destroy this vacuum, that is, re-establish the atmospheric pressure so as to release the brakes. However, such devices have not been entirely satisfactory due most to the fact that a regulated control of the application of the brakes cannot be had. In the present devices, either the entire effect of the vacuum is transmitted to the brakes or the vacuum is entirely destroyed to release the brakes. The result is that unless the operator is skilled in the manipulation of the valve supplying the vacuum to the brakes, deceleration is accompanied by sudden stops and jerks which, of course, in short time, wear out the brakes.

The present invention aims towards the correction of the prior difficulties attending such power brakes. I have invented a vacuum regulating valve which is adapted to positively control the application of vacuum to brake actuating devices such as vacuum power chambers or boosters. In this device, the amount of braking action may be small or great as desired, depending upon the amount of force exerted on the brake pedal similar to the present-day mechanical brakes. If the force is small so as to lower the brake pedal a small amount only, the braking action will be proportionately small or light. If the pressure on the brake pedal is thrusted in a manner similar to making a quick stop, the amount of vacuum supplied to the brake actuating device or booster will be proportionately great so as to effect quick braking action.

It is thus apparent that it is an object of my invention to provide a vacuum regulating valve adapted to gradually control the action of vacuum on a brake actuating device.

It is a further object of my invention to control the braking action of brakes in the proportion to the amount of pressure supplied to the brake pedal or lever.

Other objects will be apparent from the following description of my invention taken from the drawing wherein:

Fig. 1 represents a vertical cross-section of the valve regulating device showing the position of parts in normal running condition, that is, without the application of brakes;

Fig. 2 represents a section showing the position of parts during the application of vacuum so as to apply the brakes;

Fig. 3 is a similar cross-section showing the position of the parts when vacuum has been applied and then sealed off and Fig. 4 is a schematic arrangement of apparatus showing the vacuum regulating device as attached in an automobile.

Briefly stated, my invention relates to a vacuum regulating valve or device for controlling the application of vacuum to a movable device which comprises a chamber adapted to be closed or opened to the atmosphere, means for closing said chamber from the atmosphere and means for creating a vacuum in said chamber and means for retaining said vacuum in said chamber. The means for closing said chamber from the atmosphere comprises a valve adapted to contact a seat, the means for generating a vacuum in said chamber comprises a tube connected to a vacuum supply and the means for retaining said vacuum in said chamber also comprises said valve which is adapted to rest on the opening of said vacuum generating line.

More particularly stated, the vacuum regulating valve comprises a chamber, a vacuum generating line opening into said chamber, means for connecting said chamber with the atmosphere, a valve normally closing said vacuum generating line, means associated with said chamber and adapted to close said chamber from the atmosphere and to simultaneously open said vacuum generating line and to again close said vacuum generating line when a sufficient amount of vacuum has been generated in said chamber. In its preferred form, the means for closing said chamber from the atmosphere comprises a diaphragm attached to a diaphragm plate carrying a diaphragm valve seat which is adapted to receive the valve so that when said valve rests on said diaphragm seat, said chamber is effectively closed to the atmosphere. The diaphragm seat is also adapted to lift said valve off the inlet of said vacuum generating line to permit the generation of vacuum in said chamber. Moreover, said diaphragm, diaphragm plate, seat and valve are adapted to return to the inlet of said vacuum generating line when sufficient vacuum has been generated in said chamber. The invention also includes a valve cage for housing said valve and within which said valve is guided, said valve cage being attached to a valve carrying stem or rod which is associated as by means of a spring and sleeve to means for manually controlling the movement of said diaphragm seat. Other features of the invention may be observed from the following more detailed description of my invention.

Referring to Fig. 1 of the drawing, the vacuum regulating valve comprises an outer casing 10 of circular cross-section which is provided at its lower end with a flange 11. The casing 10 extends into an upper elongated tubular-like section 12. The interior of section 12 is provided with a shoulder or a valve carrying stem guide 14 which also functions as a stop for a lower spring 35. The interior wall 13 of tube 12 is preferably machine smoothed to form a guide for spring sleeve 15 which is adapted to slide in the guide 13. The casing is provided with a hole or plurality of holes 16 for the introduction of atmospheric air so that atmospheric pressure is maintained at all times in the chamber of casing 10 above the diaphragm 50 hereinafter described. Fastened as by means of bolts 17 to casing 10 is a lower casing or plate 20 also provided with flange 21. This casing is provided with a threaded hole to receive a vacuum transmitting tube 22. Centrally disposed on plate 20 is another hole through which a vacuum inlet tube 23 is passed. Tube 23 is rigidly fixed to plate 20 at the opening so as to form an air tight seal. This may be accomplished by soldering or welding as anyone skilled in the art readily understands.

Interiorly disposed in the upper section 12 of casing 10 is a valve carrying stem 24 which is threaded at its upper end to receive a nut 25 and is also threaded at its lower end to receive valve cage 26. Cage 26 is provided with a hole or a series of holes 27 and also a plurality of holes 28, the latter holes are preferably drilled into the valve cage at the lowermost point thereof as shown. Holes 27 permit maintenance of atmospheric pressure in the valve cage at all times. The valve cage is provided with a flange 30. The interior of the valve cage 26 is provided with a valve guide or wall 31 adapted to receive a valve 32 of flat circular shape and made of fiber or other suitable material. Valve 32 is urged by means of spring 33 on spring guide 34 forming the lower portion of the stem 24. This lower spring guide is preferably of smaller diameter than the upper stem so as to form a shoulder for one end of spring 33. Intermediate the valve cage 26 and spring stop 14 and positioned on the valve carrying stem 24 is another spring 35 which urges the valve cage 26 away from the guide 14. Above the guide 14 and concentrically disposed in the tube 12 is a sleeve 15 which is adapted to slide in guide 13. The lower portion is formed so as to provide a spring stop 36 for the lower end of spring 37 which is placed on valve carrying stem 24 and intermediate the nut 25 and the spring stop 36 of sleeve 15. The upper end of the sleeve 15 is provided with a groove or slot 38 to receive pin 39 fastened to yoke 40 of lever 41 which is fulcrumed at pin 42 extending through arm 43 and lever 41. The arm 43 is attached to the tube 12 as by means of welding.

Interiorly disposed in the casings 10 and 20 and attached to flange 30 of the valve cage 26 is a diaphragm 50 which is attached to the flange 30 by bolt or screws 51 extending through a diaphragm plate 52, diaphragm 50 and flange 30. The outer edge of the diaphragm is fastened between the flanges 11 and 21 by means of bolts 17 so as to form an air tight seal in chamber 49. The diaphragm is preferably of flexible material such as rubber, leather or flexible metal. The center of diaphragm plate 52 is provided with a hole of such diameter as to permit passage of the tube 23. The center of the plate is formed as to provide a raised seat 53 so as to seal off the introduction of atmospheric air into the chamber 49 when the face of valve 32 is forced on the seat 53 as will be hereinafter described. The height of the tube 23 in chamber 49 is dependent upon the relative position of the diaphragm 50, diaphragm plate 52 and diaphragm seat 53. In neutral position, that is, without application of compression on spring 37 such as would occur by raising the sleeve 15, the vacuum inlet tube 23 is extended into chamber 49 to a point where the position of seat 55 is above the seat 53 of the diaphragm plate 52 and forces the valve 32 against the upper shoulder of valve guide 31.

Thus, the valve cage unit 26 and its component parts such as stem 24, diaphragm 50 and diaphragm plate 52 are adapted to move in upwardly or downwardly directions by pushing down on lever 41 which acting through the spring 37 and sleeve 15 forces the valve cage 26 and diaphragm 50 upwardly. Vacuum in chamber 49 draws the diaphragm downwardly and moves the valve cage 26 and the parts attached thereto. Vacuum inlet tube 23 is fixed to the lower casing 20 and remains in a fixed position during all movements of the diaphragm 50. The outer end of the vacuum inlet tube 23 is machined to form a seat 55 so that when the face of the valve 32 rests thereon, the valve effectively seals off the suction created in the vacuum tube 23. Thus, if the seat 55 of tube 23 is above the seat 53 of the diaphragm plate 52, the result is that the valve 32 will be urged against spring 33 opening chamber 49 to atmospheric pressure. If seat 55 is below seat 53 of the plate, the spring 33 forces the valve 32 against the seat 53 and the valve 32 will rest on seat 53 closing chamber 49 to the atmosphere and permitting creation of vacuum in the chamber through tube 23.

It will be observed that the vacuum regulating valve is provided with the three springs 33, 35 and 37. Spring 33 is merely for the purpose of urging valve 32 against either or both of seats 53 and 55. The tension of this spring is light in comparison with springs 35 and 37. Spring 35 has a greater tension or compression than spring 33 but not as great as that of spring 37. Its function is to force the valve cage assembly against the valve seat 55. Spring 37 is the strongest of the three springs and its function is to raise the valve cage assembly including the diaphragm and diaphragm plate when acting through the sleeve 15 so that the diaphragm seat 53 may be lifted above the seat 55 to permit creation of vacuum in the chamber 49 via tube 23. In other words, when the sleeve 15 is raised as by means of the application of force on lever 41, the spring 37 is compressed and the valve carrying stem 24 is raised, lifting the valve cage 26 and the diaphragm 50 and diaphragm plate 52. Then, when the force on lever 41 is released, spring 35 lowers the valve cage 26 which, of course, lowers the valve carrying stem 24 and spring 37 returns the sleeve 15 to the guide or stop 14. This action moves the lever 41 back to its former released position.

The operation of the regulating valve may be best illustrated by application to the brakes of an ordinary automobile as shown in Fig. 4.

Referring to Fig. 4, 60 is the ordinary brake pedal of an automobile which is attached by means of pin 61 to the lever 41 of the vacuum regulating valve mechanism illustrated at 62 which is attached to the floor board 63 of the automobile by means of bracket 64. The vacuum inlet tube 23 is attached to the intake manifold 65 of the engine 66 which creates a suction in line 23. Tube 22 is attached to a booster or vacuum power chamber 67 which is of any conventional type now in use. The booster comprises a casing of two sections and attached together by means of bolts passing through the flanges provided on each casing. A diaphragm 68 is fastened between the flanges of the several casings so as to provide an air tight sealed chamber 69. The diaphragm carries a brake pull rod 70 which is attached at its other end to the brake 72 disposed around brake drum 73. In the drawing, I have shown the application of a booster to one brake only. By proper connections to the brake pull rod 70 of rods and linkages, the action of the booster may be made to apply to all or any of the brakes of the automobile. If desired, a plurality of boosters may be employed, as for example, one for each of the brakes on the car. The vacuum for each booster may be supplied by connecting vacuum lines into line or tube 22 as will be readily understood by those skilled in the art.

In the normal running position of the automobile, that is, when the brakes are not applied, the relative positions of the parts of the vacuum regulating valve are as shown in Fig. 1. The seat 55 of the vacuum inlet tube 23 is above the seat 53 of the diaphragm plate and valve 32 is at its uppermost position in the valve guide 31. This permits the atmospheric pressure operating through the holes 16 and 28 to provide an atmospheric pressure in chamber 49. Due to the space between the tube 23 and the seat 53, the atmospheric pressure is transmitted through line 22 into chamber 69 of the booster 67 which releases the diaphragm 68 and rod 70 to release the brakes 72.

When it is desired to apply the brakes of the automobile, the brake pedal 60 is lowered as by means of the foot which moves the lever 41 to a position shown approximately by the dotted lines of Fig. 4. This, in turn, raises the sleeve 15 against the tension of spring 37 and also raises the stem 24 which lifts the valve cage 26 and diaphragm 50 so that the seat 53 of diaphragm plate 52 extends above the seat 55 of the vacuum inlet tube 23. The upward movement of the seat 53 to a point above seat 55 causes seat 53 to lift valve 32 off seat 55. Thus, valve 32 is then moved off the seat 55 and rests on seat 53 of the diaphragm plate as shown in Fig. 2. This action results in sealing off the introduction of atmospheric pressure in chamber 49 and permits creation of vacuum in chamber 49 created by the intake manifold 65 operating through tube 23. The vacuum in chamber 49 is transmitted through tube 22 into chamber 69 of booster 67 which draws the diaphragm 68 and rod 70 and applies the brakes 72 on brake drum 73. When vacuum has been created in chamber 49 sufficient to overcome the tension of spring 37, the valve cage and the diaphragm will be drawn against the tension of spring 37 and seat 55 will contact valve 32 as shown in Fig. 3, thus sealing off the vacuum. This action retains the vacuum in 49 and tube 22 and chamber 69 of booster 67 holding the brakes in fixed position. The amount of vacuum created in chamber 49 is dependent upon the compression placed on spring 37 and the latter is dependent upon the distance that sleeve 15 has been raised off the guide 14. The greater the compression of spring 37, the greater the vacuum must be in chamber 49 before it will exert sufficient suction to draw the diaphragm seat 53 to the position shown in Fig. 3 so that the valve 32 will seat on seat 55.

When it is desired to entirely release the brakes, the tension on the foot pedal 60 is removed which causes spring 37 to operate through the lever 41 raising the foot pedal 60. The release of tension on the pedal 60 also causes the valve cage 26 and diaphragm 50 to be lowered due to the tension of spring 35 so that seat 53 will be lowered to a position below seat 55, valve 32 still resting on seat 55 to seal off the vacuum. The lowering of valve cage 26 permits holes 28 to be opened to the atmosphere which is transmitted into chamber 49 and through tube 22 into chamber 69 of booster 67 destroying the vacuum which permits diaphragm 68 and rod 70 to move towards the brake 72, thus releasing the brakes.

One of the particular features of my vacuum regulating valve resides in the control that is obtainable in the operation of the car in heavy traffic where the operator is constantly applying or releasing the brakes to decelerate or accelerate the speed of the car or to partially decelerate or accelerate the speed and in particular to increase the deceleration or acceleration when the speed of the car has already been partially decelerated or accelerated. In cars equipped with mechanical brakes, that is, without brake assisters such as the one described herein, the aforesaid action is obtained by regulation of the pressure on the brake pedal. If it is desired to make a quick stop, the operator applies considerable pressure on the brake pedal which is transmitted to the brakes through levers and linkages. If he desires to release the brakes, he merely removes the pressure on the brake pedal. If he has applied the brakes partially so as to decelerate partially and then desires to increase the deceleration, he applies a greater force on the brake pedal and conversely, if he desires to accelerate from a partial deceleration, he removes the force on the brake in accordance to the amount he desires to accelerate. This action is obtained with my vacuum regulating valve in exactly the same manner as described above with mechanical brakes and the effect will be exactly the same except that the force required to accomplish the result is considerably less than when the car is merely equipped with mechanical brakes.

When the brake pedal is operated in the foregoing manner, the occurrences in the vacuum regulating valve may be described as follows:

The action and position of the parts in the vacuum regulating valve when the application of vacuum to the chamber 49 and the subsequent release of vacuum has been made is described above. Assuming that the brakes have been partially applied, the relation of the parts will be as described above and as shown in Fig. 3 so that the valve is contacting both of the seats 53 and 55 to seal off the atmospheric pressure and the creation of further vacuum. Suppose it is then desired to obtain a further application of braking power such as is the case when the operator desires to further decelerate the car for to make a full stop, the operator would then lower the brake pedal still further. This causes sleeve 15 to be raised proportionately placing spring 37 under a greater tension and lifting the diaphragm 50, diaphragm plate 52 and seat 53 which removes the valve 32 off seat 55. This permits the creation of a greater vacuum in chamber 49 which is transmitted through tube 22 to the booster 69 drawing the brake pull rod 70 and thus making the application of the brakes. When the vacuum created in chamber 49 is increased sufficiently to overcome the tension of spring 37, the vacuum will draw the diaphragm and valve on seat 55 thus sealing off the vacuum and holding the created vacuum.

Now suppose it is desired to partially release the brakes, the operator, of course, will release the pressure on the foot pedal to the desired extent. This causes the sleeve 15 to drop accordingly due to the tension of spring 35 and permits the lowering of the valve cage 26 and thus the diaphragm plate 52 which lowers the diaphragm seat 53 off the valve 32. This causes partial introduction of atmospheric pressure into the chamber 49 via air holes 16 and 28 which acting through the booster partially releases the brakes. When sufficient air has been introduced into chamber 49, the increased pressure will force the diaphragm seat 53 up against the valve due to the flexibility of the diaphragm carrying the plate 52, thus sealing off the introduction of air into the chamber and holding the partially destroyed vacuum in the chamber 49 which holds the partially released brakes.

It will be observed that while I have described the regulation of my vacuum regulating valve as acting through the medium of a foot pedal, it is not entirely necessary that the action be effected in this manner. If desired, the valve may be operated by means of a lever attached to the dash board or steering rod of the automobile and the application of the brakes may be effected by means of the operator's hand. Furthermore, the ordinary mechanical brakes operable by the foot pedal may be retained as originally installed on the car and the use of the vacuum regulating valve may be supplemental thereto.

It is to be understood that the above description is merely illustrative of a preferred embodiment of my invention of which many variations thereof may be made by those skilled in the art without departing from the spirit thereof.

I claim:

1. In a vacuum regulating device, a chamber normally open to the atmosphere, a flexible member, means attached to said flexible member carrying a valve seat, a vacuum generating line leading into said chamber, flat circular valve means adapted to seat on said valve seat to close said chamber from atmosphere and to seat on said vacuum generating line to close said line from vacuum, a valve cage attached to said flexible member, a stem on said valve cage, a spring on said stem to urge said valve cage and valve seat towards said vacuum generating line to seat said valve on said vacuum generating line, a sleeve, a spring attaching sleeve to said stem and means to raise said sleeve.

2. In a vacuum regulating device, a chamber normally open to the atmosphere, an upper housing, a flexible member intermediate said upper housing and said chamber, a valve seat attached to said flexible member, a valve cage attached to said flexible member positioned in said upper housing, a valve stem attached to said valve cage extending into said upper housing, a sleeve in the upper portion of said upper housing carrying a portion of said valve stem and adapted to slide in the upper portion of said housing, a spring on said valve stem in said sleeve, a spring on said valve stem intermediate said valve cage and said sleeve, said spring being of lighter tension and compression than said first mentioned spring, a vacuum generating line leading into said chamber, a valve in said valve cage adapted to seat on said valve seat and on said vacuum generating line to close said vacuum generating line from vacuum and to close said chamber from the atmosphere and means to raise said sleeve.

HAROLD L. HICKMAN.